US011915729B1

(12) United States Patent
Wu et al.

(10) Patent No.: US 11,915,729 B1
(45) Date of Patent: Feb. 27, 2024

(54) DISK WRITING MODE WITH TIMING CONTROL OF MAIN POLE RELAXATION

(71) Applicant: Marvell Asia Pte Ltd, Singapore (SG)

(72) Inventors: Kai Wu, Singapore (SG); Hao Fang, Eden Prairie, MN (US); Jorge Estuardo Licona, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/156,852

(22) Filed: Jan. 19, 2023

Related U.S. Application Data

(60) Provisional application No. 63/407,143, filed on Sep. 15, 2022, provisional application No. 63/318,378, filed on Mar. 9, 2022, provisional application No. 63/318,366, filed on Mar. 9, 2022.

(51) Int. Cl.
*G11B 20/10* (2006.01)
*G11B 11/105* (2006.01)
*G11B 5/09* (2006.01)

(52) U.S. Cl.
CPC ..................................... *G11B 5/09* (2013.01)

(58) Field of Classification Search
CPC .. G11B 5/012; G11B 5/09; G11B 5/39; G11B 20/10222; G11B 2005/0018; G11B 2005/0021; G11B 5/00; G11B 20/10037; G11B 20/1217; G11B 20/10009; G11B 5/6047; G11B 11/10508; G11B 11/10588; G11B 20/12

USPC .................... 360/59, 42, 48; 369/59.1, 59.12
See application file for complete search history.

(56) References Cited

U.S. PATENT DOCUMENTS

| 7,142,382 | B2 * | 11/2006 | Nagano | ................... | H03C 3/02 |
| | | | | | 360/49 |
| 10,734,016 | B2 | 8/2020 | Oberg et al. | | |
| 10,984,822 | B2 | 4/2021 | Oberg et al. | | |
| 11,270,723 | B2 | 3/2022 | Oberg et al. | | |
| 2013/0128375 | A1 | 5/2013 | Livshitz et al. | | |

\* cited by examiner

*Primary Examiner* — Nabil Z Hindi

(57) ABSTRACT

When writing data to a magnetic data storage medium, it is detected whether duration, before occurrence of a data transition, of data to be written exceeds a predetermined threshold. When the duration, before the transition, of the data to be written exceeds the predetermined threshold, the data is written by applying an initial pulse and then maintaining, until a shut-off pulse, a steady-state write current having an amplitude less than the initial pulse. A shut-off adjustment is determined based on a predetermined delay. The shut-off pulse is initiated at a time based on one bit period prior to the transition, adjusted by the shut-off adjustment. When the duration, before the transition, of the data to be written is at most equal to the predetermined threshold, the data is written by applying the initial pulse without applying a steady-state write current before the transition.

19 Claims, 12 Drawing Sheets

DISK WRITING MODE WITH TIMING CONTROL OF MAIN POLE RELAXATION

CROSS REFERENCES TO RELATED APPLICATIONS

This disclosure claims the benefit of copending, commonly-assigned U.S. Provisional Patent Applications Nos. 63/318,366 and 63/318,378, both filed Mar. 9, 2022, and Application No. 63/407,143, filed Sep. 15, 2022. Each of the three provisional patent applications is hereby incorporated by reference herein in its respective entirety.

FIELD OF USE

This disclosure relates to the writing of data to magnetic disk drives. More particularly, this disclosure relates to a writing mode providing for main pole relaxation prior to a bit transition.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In a magnetic disk drive, the main pole of a write bubble of even the shortest duration can extend several bit periods in the down-track direction. Thus, for example, whether writing one, two or three bits, a magnetic pole or bubble with a duration of at least three bit periods (3 T) may be created, and must be overcome by an opposite pulse if a bit transition is needed.

SUMMARY

In accordance with implementations of the subject matter of this disclosure, a method for writing data to a magnetic data storage medium includes detecting whether duration, before occurrence of a data transition, of data to be written exceeds a predetermined threshold, and when the duration, before the occurrence of the data transition, of the data to be written exceeds the predetermined threshold, writing the data by applying an initial pulse and then maintaining, until a shut-off pulse, a steady-state write current having an amplitude less than the initial pulse, determining a shut-off adjustment based on a predetermined delay, initiating the shut-off pulse at a time that is based on one bit period prior to the occurrence of the data transition, adjusted by the shut-off adjustment, and when the duration, before the occurrence of the data transition, of the data to be written is at most equal to the predetermined threshold, writing the data by applying the initial pulse without applying a steady-state write current before the data transition.

In a first implementation of such a method, the predetermined threshold may be a single bit duration.

According to a first aspect of that first implementation, when the duration, before the occurrence of the data transition, of the data to be written is a single-bit duration, the writing may be performed by applying the initial pulse for all of the duration of the data to be written.

According to a second aspect of that first implementation, when the duration, before the occurrence of the data transition, of the data to be written exceeds a single-bit duration, the writing may be performed by applying the initial pulse for a single-bit duration, plus an overshoot duration.

A second implementation of such a method may further include, when the duration, before the occurrence of the data transition, of the data to be written exceeds the predetermined threshold, on occurrence of the shut-off pulse, reducing magnitude of the steady-state write current to zero, and maintaining zero steady-state write current until the data transition occurs.

In a third implementation of such a method, determining the shut-off adjustment based on the predetermined delay may include determining the shut-off adjustment based on a programmable predetermined delay.

In accordance with implementations of the subject matter of this disclosure, a storage device includes a magnetic data storage medium, a write head for writing data onto the magnetic data storage medium, and control circuitry for controlling the writing of data onto the magnetic data storage medium, the control circuitry being configured to detect whether duration, before occurrence of a data transition, of data to be written exceeds a predetermined threshold, and when the duration, before the occurrence of the data transition, of the data to be written exceeds the predetermined threshold, write the data by applying an initial pulse and then maintain, until a shut-off pulse, a steady-state write current having an amplitude less than the initial pulse, determine a shut-off adjustment based on a predetermined delay, initiate the shut-off pulse at a time that is based on one bit period prior to the occurrence of the data transition, adjusted by the shut-off adjustment, and when the duration, before the occurrence of the data transition, of the data to be written is at most equal to the predetermined threshold, write the data by applying the initial pulse without applying a steady-state write current before the data transition.

In a first implementation of such a storage device, the predetermined threshold may be a single bit duration.

According to a first aspect of that first implementation, the control circuitry may be configured to, when the duration, before the occurrence of the data transition, of the data to be written is a single-bit duration, write the data by applying the initial pulse for all of the duration of the data to be written.

According to a second aspect of that first implementation, the control circuitry may be configured to, when the duration, before the occurrence of the data transition, of the data to be written exceeds a single-bit duration, write the data by applying the initial pulse for a single-bit duration, plus an overshoot duration.

In a second implementation of such a storage device, the control circuitry may further be configured to, when the duration, before the occurrence of the data transition, of the data to be written exceeds the predetermined threshold, on occurrence of the shut-off pulse, reduce magnitude of the steady-state write current to zero, and maintain zero steady-state write current until the data transition occurs.

In a third implementation of such a storage device, the control circuitry may be configured to determine the shut-off adjustment based on a programmable predetermined delay.

In accordance with implementations of the subject matter of this disclosure, a storage device includes a magnetic data storage medium a write head for writing data onto the magnetic data storage medium, a preamplifier configured to apply write current signals to the write head, and control circuitry for controlling generation of the write current signals by the preamplifier for writing the data onto the magnetic data storage medium, the control circuitry including write logic configured to generate, from decoded source signals, data signals to be written onto the magnetic data storage medium by the write head, and magnetic pole control logic configured to detect whether duration, before occurrence of a data transition, of data to be written exceeds a predetermined threshold and when the duration, before the occurrence of the data transition, of the data to be written exceeds the predetermined threshold, send instruction signals to the preamplifier to write the data by applying an initial pulse and then maintain, until a shut-off pulse, a steady-state write current having an amplitude less than the initial pulse, determine a shut-off adjustment based on a predetermined delay, initiate the shut-off pulse at a time that is based on one bit period prior to the occurrence of the data transition, adjusted by the shut-off adjustment, and when the duration, before the occurrence of the data transition, of the data to be written is at most equal to the predetermined threshold, send instruction signals to the preamplifier to write the data by applying the initial pulse without applying a steady-state write current before the data transition.

In a first implementation of such a storage device, the predetermined threshold may be a single bit duration.

According to a first aspect of that first implementation, the magnetic pole control logic may be configured to, when the duration, before the occurrence of the data transition, of the data to be written is a single-bit duration, send instruction signals to the preamplifier to write the data by applying the initial pulse for all of the duration of the data to be written.

According to a second aspect of that first implementation, the magnetic pole control logic may be configured to, when the duration, before the occurrence of the data transition, of the data to be written exceeds a single-bit duration, send instruction signals to the preamplifier to write the data by applying the initial pulse for a single-bit duration, plus an overshoot duration.

In a second implementation of such a storage device, the magnetic pole control logic may further be configured to, when the duration, before the occurrence of the data transition, of the data to be written exceeds the predetermined threshold, on occurrence of the shut-off pulse, send instruction signals to the preamplifier to reduce magnitude of the steady-state write current to zero, and maintain zero steady-state write current until the data transition occurs.

In a third implementation of such a storage device, the magnetic pole control logic may be configured to determine the shut-off adjustment based on a programmable predetermined delay.

In a fourth implementation of such a storage device, the preamplifier may include latch circuitry for converting the instruction signals to control write current signals.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Typically, when writing a number of bits, an initial pulse is applied to the write head, and then a steady-state write current of smaller amplitude is applied to the write head for the balance of the duration of the write period, to maintain the magnetization state of the recording medium. The pulse width may be 1 T with no current tail for a 1 T write duration, but for a write period of duration 2 T or more, a pulse of slightly longer than 1 T (referred to as an OSD pulse as discussed below) may be applied to change the magnetization state of the recording medium, with the smaller steady-state write current applied for the balance of the duration of the write period.

As noted above, in a magnetic disk drive, the main pole of a write bubble of even the shortest duration can extend between 10 nm and 150 nm—i.e., several bit periods—in the down-track direction. Thus, for example, whether writing one, two or three bits (1 T, 2 T or 3 T writing duration), a bubble with a duration of at least 3 T may be created, and must be overcome by an opposite pulse if a bit transition is needed before that bubble relaxes, which may have a negative impact on the magnetic profile leading to indistinct transitions.

Therefore, in accordance with implementations of the subject matter of this disclosure, the signal applied to the write head of a magnetic disk drive may be altered to allow the main pole to begin to relax (i.e., demagnetize) before the end of the write duration, so that if a bit transition follows before the bubble ends, the magnetic profile is improved, leading to a sharper transition.

Specifically, the signal applied to the write head may include an initial pulse followed by a steady-state write current as described above, but for a pulse longer than 1 T (i.e., for two or more consecutive bits), the steady-state write current is turned off prior to the end of the full multi-bit period, to allow the magnetization state of the recording medium to begin to relax.

In typical disk drive write channel architectures, signals to the write head are generated by a preamplifier with limited processing capability. As described in more detail below, existing write channel control circuitry may be configured in accordance with implementations of the subject matter of this disclosure to send appropriate control signals, along with the data to be written, to the preamplifier, which may be modified as described below with circuitry to turn off the steady-state write current based on those control signals.

The subject matter of this disclosure may be better understood by reference to FIGS. 1-12.

Figure 1:
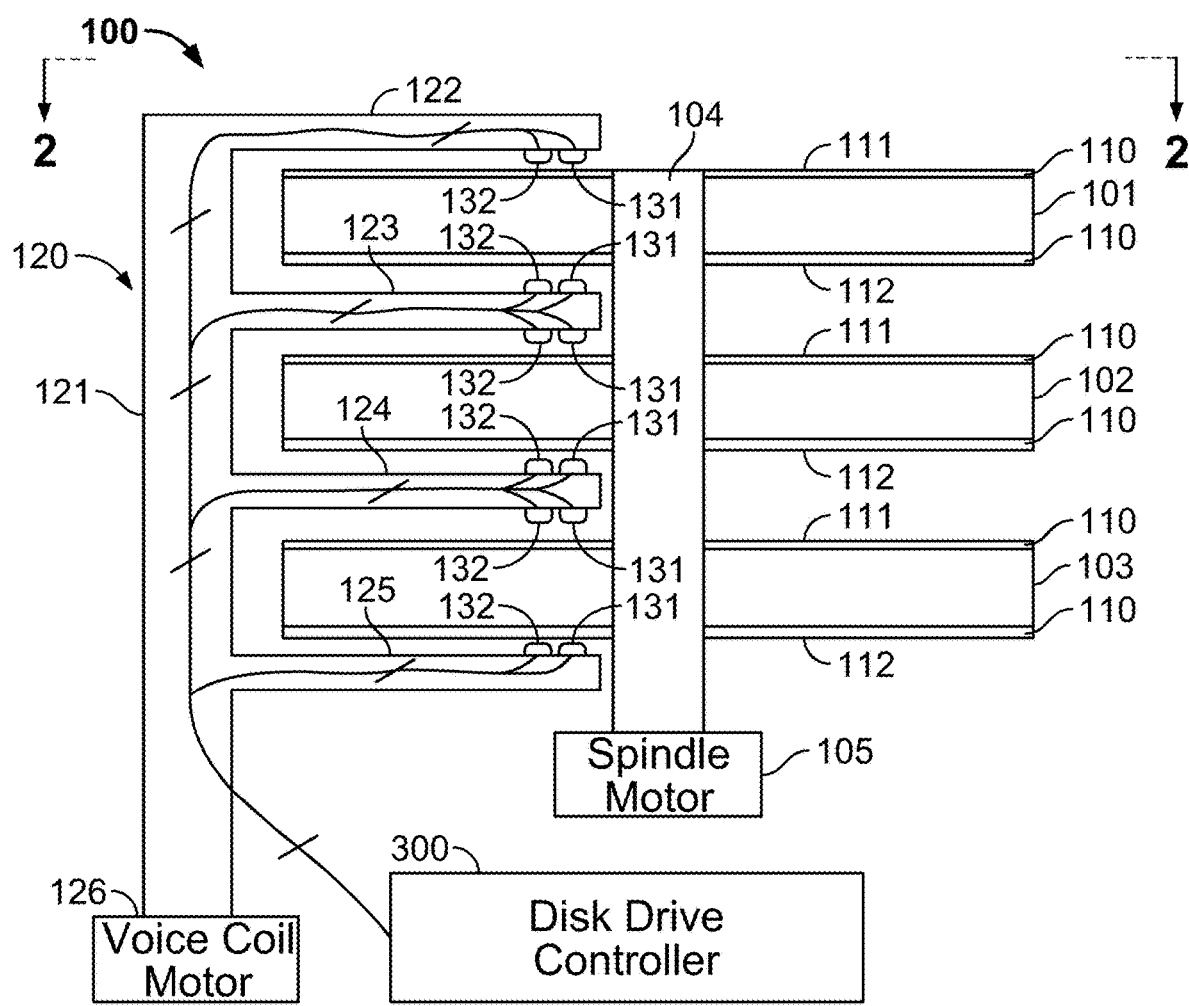
FIGS. 1 and 2 show an example of a disk drive with which the subject matter of the present disclosure may be used.
Figure 2:
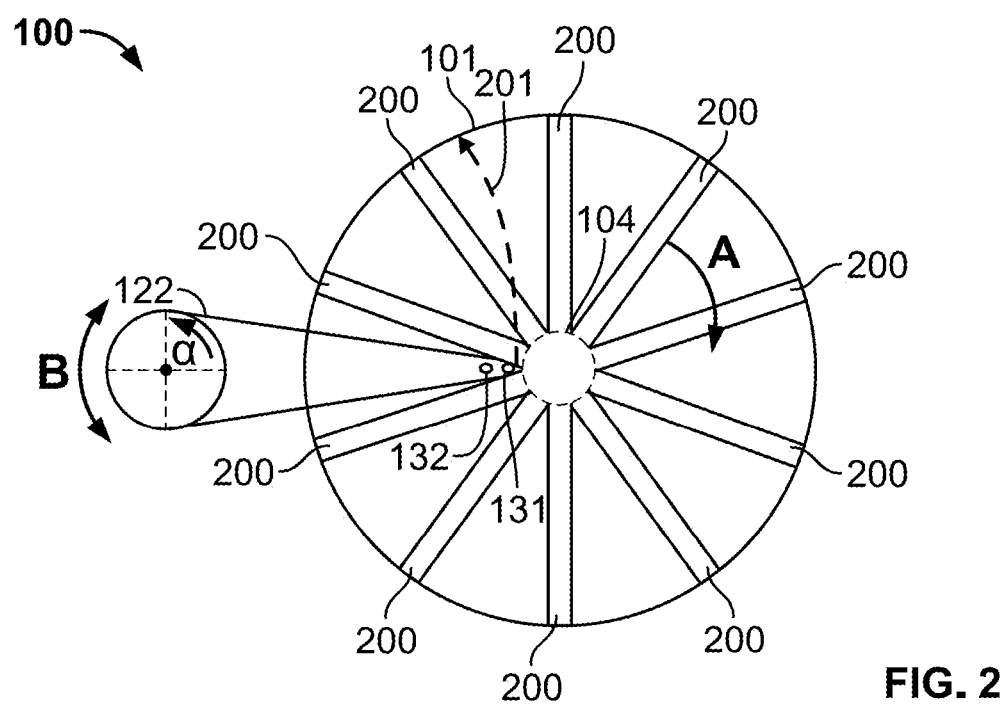

FIGS. 1 and 2 show an example of a disk drive 100 with which the subject matter of the present disclosure may be used. In this particular example, disk drive 100 has three platters 101, 102, 103, although any number of platters may be included in a disk drive with which the subject matter of the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Spindle motor 105 rotates spindle 104 to rotate platters 101-103 in the direction of arrow A (FIG. 2). Although spindle motor 105 is shown connected directly to spindle 104, in some cases spindle motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and may represent, respectively, read and write sensors, although it in some applications each arm 123, 124 may bear more than one read head/sensor and more than one write head (not shown). In the configuration shown in FIGS. 1 and 2, arms 122-125 are aligned along a radius of platters 101-103. However, it should be noted that FIGS. 1 and 2 are schematic only and not to scale. Normally, the spindle diameter would be larger relative to the disk diameter. Moreover, arms 122-125 normally cannot point directly at the center of the disk.

A motor 126, commonly referred to as a "voice-coil motor," rotates actuator 121 back and forth along the directions of arrow B (FIG. 2) to move the heads 131, 132 along the path indicated by dashed arrow 201. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

Servo "wedges" 200 are located on surface 111 of platter 101 (the other surfaces are similar) as shown in FIG. 2. Each servo wedge 200 includes data identifying it by wedge index, track index, or sector number (to give an angular, tangential or circumferential position) and by data representing, at each point along a radius of the platter, the distance from spindle 104. Although the boundaries of each wedge 200 are shown as being parallel, that may be the case in some implementations such as constant-density servo implementations, but in other implementations wedges 200 will actually be wedge-shaped, with boundaries extending along radii of the platter.

Figure 3:
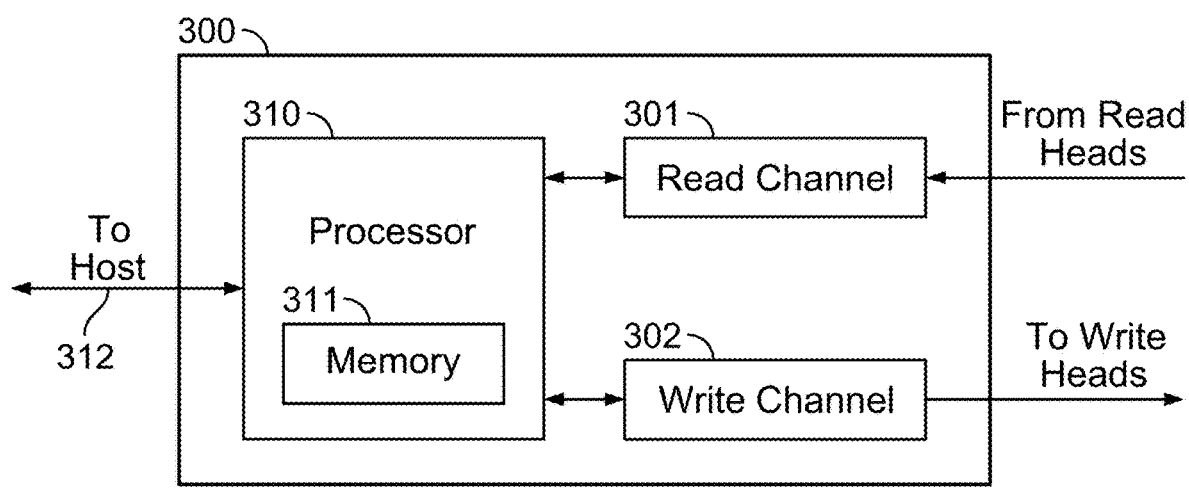
FIG. 3 is a diagram of a hard drive controller that may be used in a disk drive as in FIGS. 1 and 2 in implementations of the subject matter of this disclosure.

Each of read/write heads 131, 132 is connected to a read channel 301 and a write channel 302 of a hard drive controller 300 (FIG. 3). Hard drive controller 300 also includes a processor 310 and memory 311, as well as a connection 312 to a host processor (not shown). A servo control loop in hard drive controller 300 uses position error sensor (PES) data and the servo wedge data to keep the heads 131, 132 on track.

Figure 4:
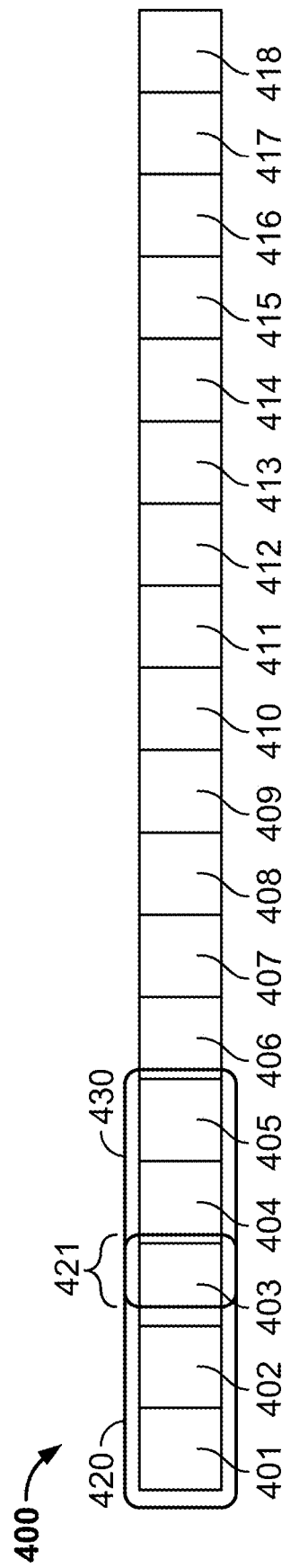
FIG. 4 is a representation, in simplified form, of a data track of a disk drive according to some implementations of the subject matter of this disclosure.

FIG. 4 shows, in simplified form, one data track 400 of disk drive 100 according to some implementations of the subject matter of this disclosure. Track 400 is depicted linearly, although in actuality it may be circular. Each square 401-418 represents the area occupied by one data bit, although the shape of such an area, and its length relative to the width of track 400, may not be to scale.

In order to write one bit of data to one of areas 401-418, a signal is applied to a write head 132 for a duration corresponding to the amount of time that the write head 132 is over that one of areas 401-418, at the disk rotational speed. As discussed above, if a pulse is applied to area 401 for a duration of 1 T to write a bit only to area 401, a magnetic bubble 420 will be formed that not only extends over area 401, but also may extend over areas 402, 403, corresponding to a duration of about 3 T. The same magnetic bubble might form if one were attempting to write two bits (to areas 401, 402) or three bits (to areas 401-403).

If one were not attempting, however, to write three bits, there may be a new write attempt at area 403 (assuming, e.g., that only one or two bits were being written by magnetic bubble 420), creating a new magnetic bubble 430. As drawn, magnetic bubble 430 also has a 3 T duration, but magnetic bubble 430 could have a longer duration if four or more bits were to be written by magnetic bubble 430. If magnetic bubble 430 represents the writing of bits opposite that, or those, written by magnetic bubble 420, then during the overlap period 421, magnetic bubble 430 has to overcome the effects of magnetic bubble 420, leading to an indistinct or blurry bit transition. The situation may be similar for writing durations longer than 3 T where, although the excess duration of the magnetic bubble may be of a lesser degree, there still may be an overlap with the next pulse leading to an indistinct or blurry bit transition.

Therefore, in order to provide a sharper bit transition at the writing event that generates magnetic bubble 430, the signal or signals that generate magnetic bubble 420 may be turned off early, to allow the main pole of magnetic bubble 420 to begin to relax prior to the initiation of magnetic bubble 430.

Figure 5:
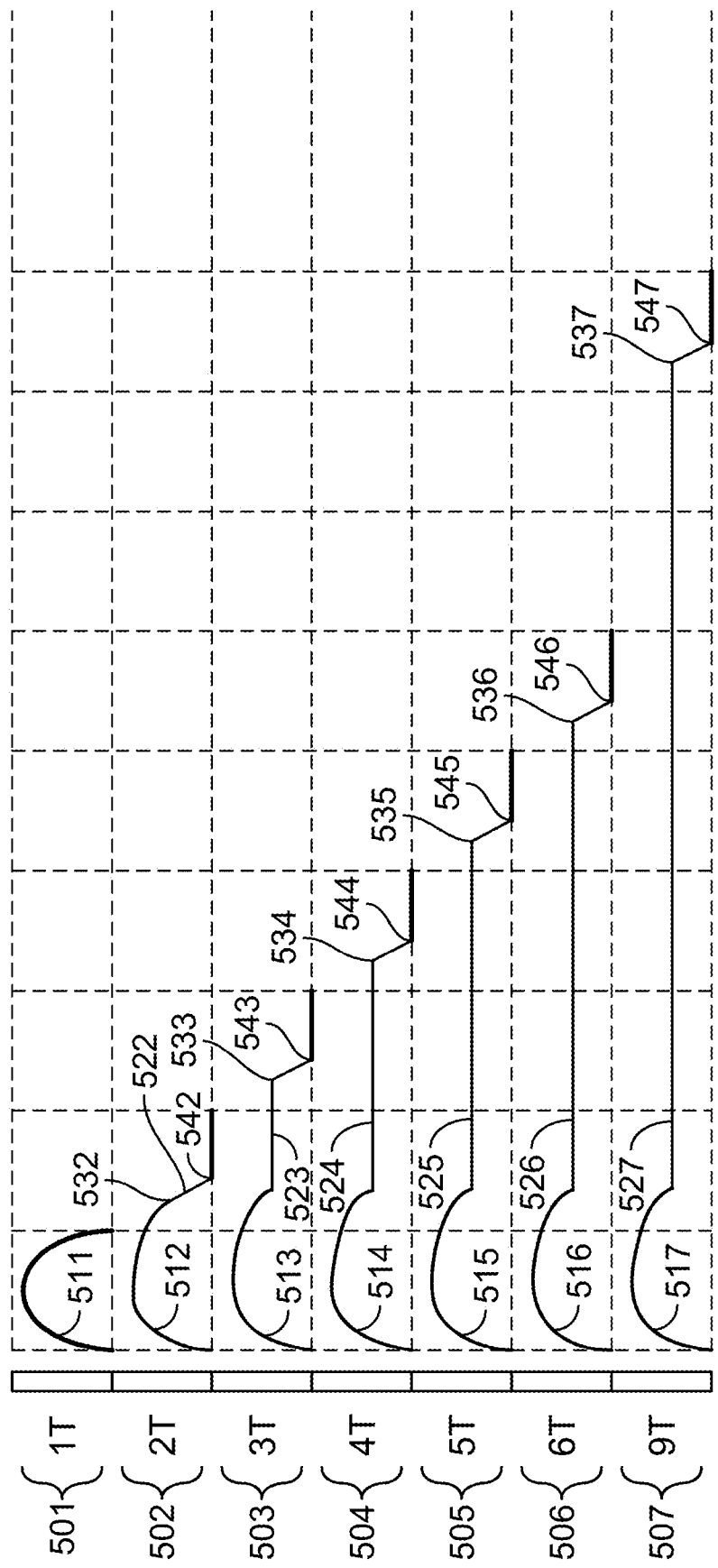
FIG. 5 shows a first pattern of pulses that may be applied to the write head of a disk drive in accordance with the subject matter of this disclosure.

According to some implementations, the pulses applied to the write head may be those shown in FIG. 5. For a write duration of 1 T, a 1 T pulse 511 as shown at 501 may be applied. For such a short lone 1 T pulse, additional current, known as dynamic overshoot amplitude (dOSA) may be applied in addition to a steady-state write current IW and an overshoot amplitude (OSA), as is typically done. For a write duration of 2 T, as shown at 502, a pulse 512 having an overshoot amplitude (OSA) may be applied for an overshoot duration (OSD) longer than 1 T but shorter than 2 T to achieve the desired magnetization state, followed by a steady-state write current IW (522). In accordance with implementations of the subject matter of this disclosure, steady-state write current IW (522) is turned off, and begins to reduce, at 532, and is completely turned off from 542 until 2 T, to allow the magnetization state to begin to relax prior to the beginning of any following pulse.

As shown at 503, for a write duration of 3 T, an OSD pulse 513 having, e.g., the same amplitude and duration as in the 2 T case 502, may be applied to achieve the desired magnetization state, followed by a steady-state write current IW (523). In accordance with implementations of the subject matter of this disclosure, steady-state write current IW (523) is turned off, and begins to reduce, at 533, and is completely turned off from 543 until 3 T, to allow the magnetization state to begin to relax prior to the beginning of any following pulse.

As shown at 504, for a write duration of 4 T, an OSD pulse 514 having, e.g., the same amplitude and duration as in the 2 T case 502, may be applied to achieve the desired magnetization state, followed by a steady-state write current IW (524). In accordance with implementations of the subject matter of this disclosure, steady-state write current IW (524) is turned off, and begins to reduce, at 534, and is completely turned off from 544 until 4 T, to allow the magnetization state to begin to relax prior to the beginning of any following pulse.

As shown at 505, for a write duration of 5 T, an OSD pulse 515 having, e.g., the same amplitude and duration as in the 2 T case 502, may be applied to achieve the desired magnetization state, followed by a steady-state write current IW (525). In accordance with implementations of the subject matter of this disclosure, steady-state write current IW (525) is turned off, and begins to reduce, at 535, and is completely turned off from 545 until 5 T, to allow the magnetization state to begin to relax prior to the beginning of any following pulse.

As shown at 506, for a write duration of 6 T, an OSD pulse 516 having, e.g., the same amplitude and duration as in the 2 T case 502, may be applied to achieve the desired magnetization state, followed by a steady-state write current IW (526). In accordance with implementations of the subject matter of this disclosure, steady-state write current IW (526) is turned off, and begins to reduce, at 536, and is completely turned off from 546 until 6 T, to allow the magnetization state to begin to relax prior to the beginning of any following pulse.

As shown at 507, for a write duration of 9 T (the 7 T and 8 T cases, not shown, are similar), an OSD pulse 517 having, e.g., the same amplitude and duration as in the 2 T case 502, may be applied to achieve the desired magnetization state, followed by a steady-state write current IW (527). In accordance with implementations of the subject matter of this disclosure, steady-state write current IW (527) is turned off, and begins to reduce, at 537, and is completely turned off from 547 until 9 T, to allow the magnetization state to begin to relax prior to the beginning of any following pulse.

In these implementations, the absence, for a controllable period prior to the end of the pulse, of steady-state write current IW, allows the main pole to begin to relax, allowing sharper transitions if the next bit has the opposite value, as described above. Although the controllable period is illustrated as being of the same duration, and having the same uniform rate of decrease, that is not necessary. For example, the controllable period may have different durations depending on characteristics of the write bubble that is to be relaxed, which in turn depends on properties of the write head and storage medium, as well as write frequency and other factors.

Although the signals in FIG. 5 are shown as single-ended, in many implementations the signals are differential. For differential signals, the waveforms in FIG. 5 represent the positive leg, while the negative leg may be a mirror image.

Figure 6:
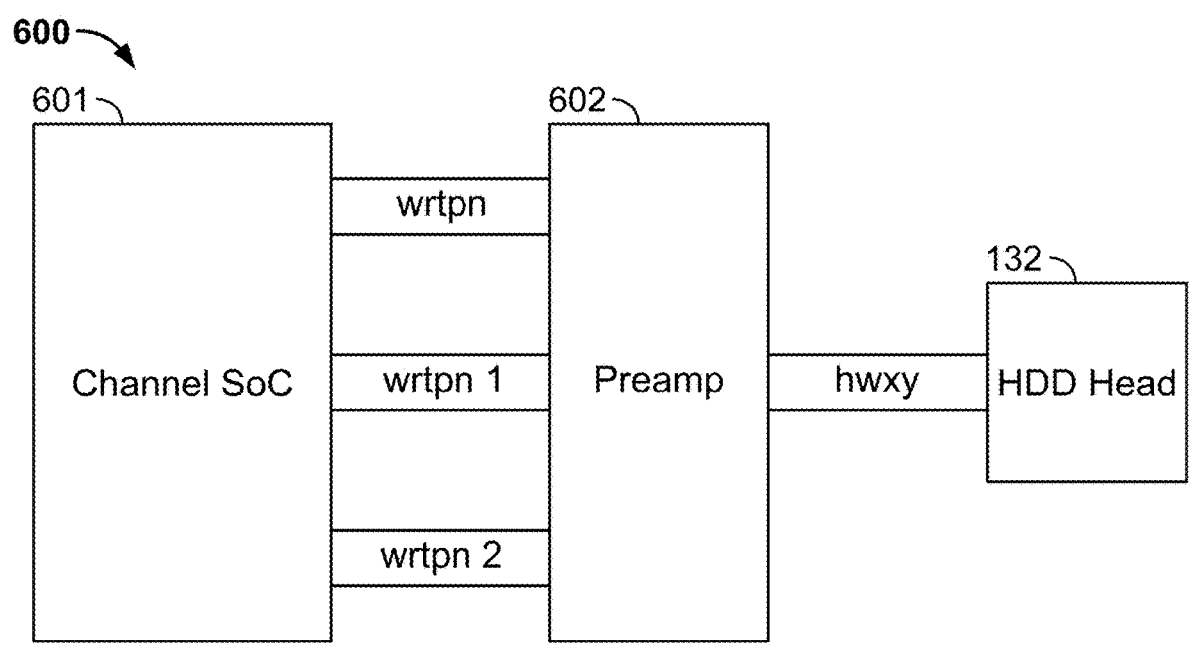
FIG. 6 shows an implementation of a write channel in accordance with the subject matter of this disclosure.

Implementations of hard drive controller 300, and particularly write channel 302, may be configured to apply write patterns such as those described in FIG. 5 (or that are otherwise within the scope of this description). As shown in FIG. 6, an implementation 600 of write channel 302 may include a write channel circuitry 601 (which may be a system-on-chip relying on processor 310 or including its own processor or firmware circuitry, or may be hard-wired) to generate instruction signals wrtpn, wrtpn1, wrtpn2 (as described below) for preamplifier circuitry 602 to apply the desired signals to write head 132.

Figure 7:
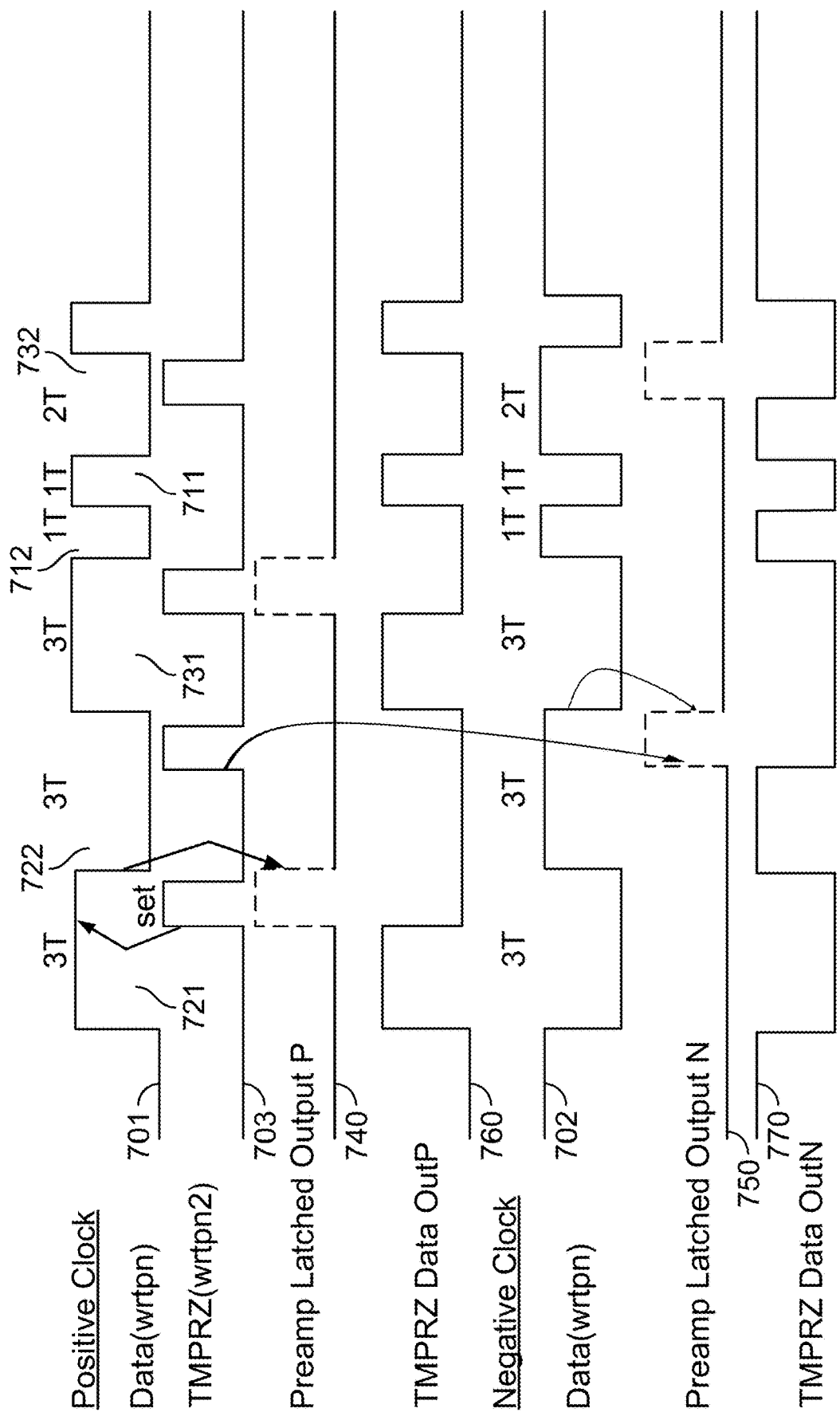
FIG. 7 shows a first pattern of signals that may be used to generate the pattern of write pulses shown in FIG. 5 in accordance implementations with the subject matter of this disclosure.

The write patterns of FIG. 5 may be generated by the signals seen in FIG. 7. In many implementations, the signals are differential signals, and FIG. 7 shows both the positive leg 701 and the negative leg 702 of the differential data signal to be written. At least three signals are sent from write channel circuitry 601 to preamplifier 602. wrtpn signal 701/702 (in a differential implementation) specifies the data to be written. In the example of FIG. 7, the data includes three '1s', three '0s', three '1s', one '0', one '1', two '0s' and one '1', followed by an extended number of '0s', and signal 701 is the positive expression of that data, while signal 702 is the negative expression of that data. The wrtpn1 signal (not shown in FIG. 7) specifies that dOSA (see above) is to be applied, and is asserted when the data on wrtpn signal 701/702 has a duration of 1 T (whether a single '1' or a single '0'). Thus, wrtpn1 is asserted (not shown) for both the '0' pulse 712 of duration 1 T and the '1' pulse 711 of duration 1 T, although the dOSA to be applied is of opposite senses for those two pulses.

wrtpn2 signal 703 specifies, for pulse durations of 2 T or greater, when steady-state write current IW is to be turned off. Thus, because each of positive-going 3 T write pulses 721 and 731 is of duration 2 T or longer, wrtpn2 signal 703 is asserted prior to the end of each of those pulses 721, 731, but for positive-going 1 T write pulse 711, wrtpn2 signal 703 is not asserted. Similarly, for negative-going 3 T write pulse 722 and negative-going 2 T write pulse 732, wrtpn2 signal 703 is asserted prior to the end of each of those pulses 722, 732, but for negative-going 1 T write pulse 712, wrtpn2 signal 703 is not asserted.

When wrtpn2 signal 703 is asserted, it is asserted for a duration of 1 T and, in the implementation of FIG. 7, at a time that precedes the end of the corresponding write pulse 721, 731, 722, 732 by an amount equal to 1 T plus an additional delay. Assertion of wrtpn2 signal 703 causes the corresponding write current to turn off, as described above, beginning at the time of assertion of wrtpn2 signal 703, until the normal end of the corresponding write interval, even though that normal end is beyond the end (by the aforementioned additional delay amount) of the duration of assertion of wrtpn2 signal 703. This corresponds to a latched (see FIG. 11) control signal 740 which, for positive-going pulses of data signal 701/702, rises on the rising edge of wrtpn2 signal 703 and falls on the falling edge of data signal 701, and a latched control signal 750 which, for negative-going pulses of data signal 701/702, rises on the rising edge of wrtpn2 signal 703 and falls on the falling edge of negative data signal 702.

The positive relaxation clock TMPRZ 760 is the difference between positive data signal 701 and latched control signal 740, and represents the time during which the OSD pulse and the write current IW are applied for a positive-going data pulse. The negative relaxation clock TMPRZ 770 is the difference between negative data signal 702 and latched control signal 750, and represents the time that the OSD pulse and the write current IW are applied for a negative-going data pulse.

The signals in FIG. 7 are applied to turn off IW more than 1 T before IW would otherwise be turned off. However, the specific time that IW should be turned off is dependent on properties of the recording medium and the write head, as well as on the frequency of the write current. Therefore the amount of delay—i.e., the excess over 1 T of the duration during which IW is turned off—will vary from implementation to implementation. Moreover, in some implementations, the delay will be negative—i.e., IW will be turned off less than 1 T before it would otherwise be turned off. This is illustrated in FIG. 8.

Figure 8:
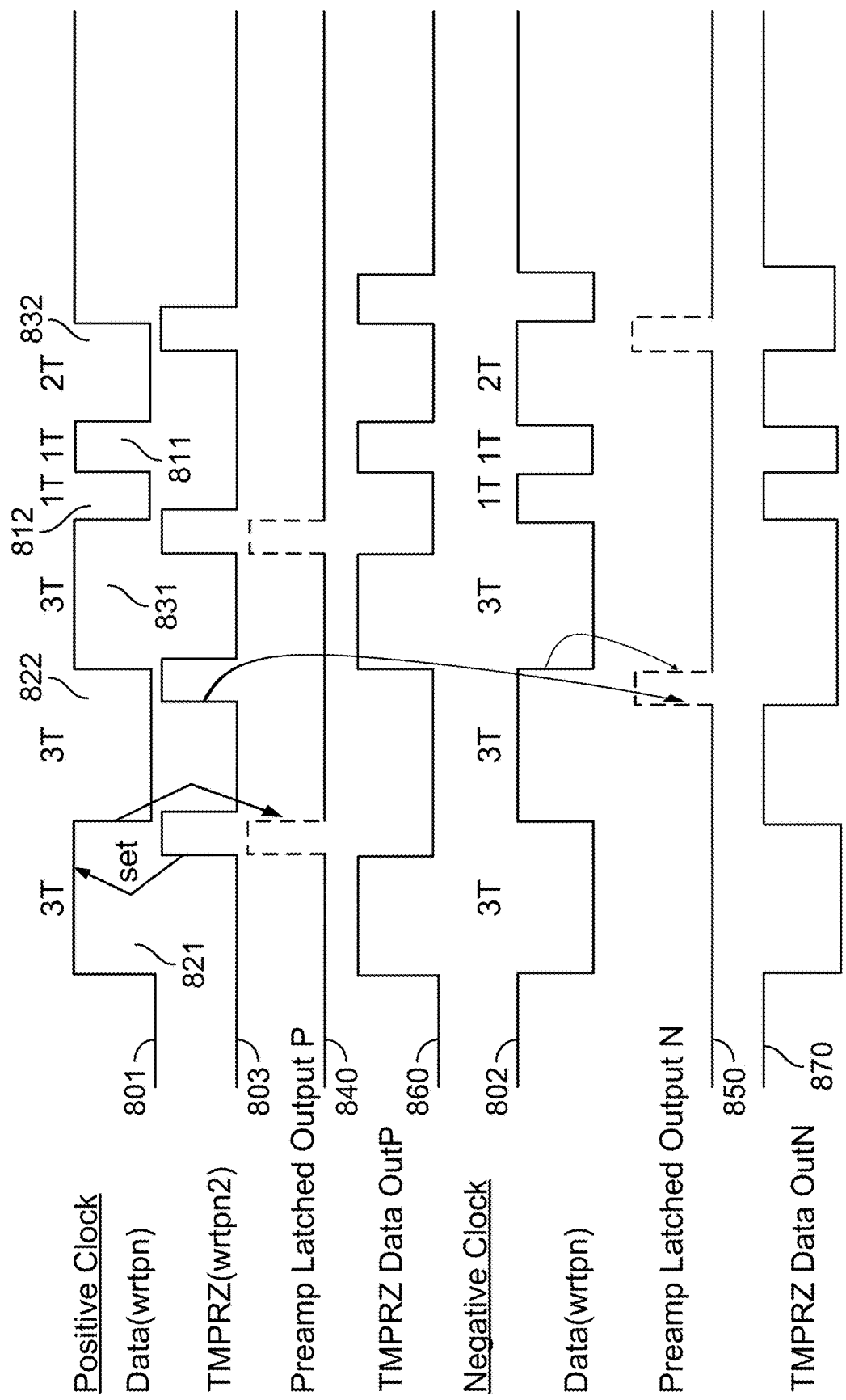
FIG. 8 shows a second pattern of signals that may be used to generate the pattern of write pulses shown in FIG. 5 in accordance implementations with the subject matter of this disclosure.

FIG. 8 is similar to FIG. 7. wrtpn signal 801/802 (in a differential implementation) specifies the data to be written. In the example of FIG. 8, as in FIG. 7, the data includes three '1s', three '0s', three '1s', one '0', one '1', two '0s' and one '1', followed by an extended number of '0s', and signal 801 is the positive expression of that data, while signal 802 is the negative expression of that data. The wrtpn1 signal (not shown in FIG. 8) specifies that dOSA (see above) is to be applied, and is asserted when the data on wrtpn signal 801/802 has a duration of 1 T (whether a single '1' or a single '0'). Thus, wrtpn1 is asserted (not shown) for both the '0' pulse 812 of duration 1 T and the '1' pulse 811 of duration 1 T, although the dOSA to be applied is of opposite senses for those two pulses. wrtpn2 signal 803 specifies, for pulse durations of 2 T or greater, when steady-state write current IW is to be turned off. Thus, because each of positive-going 3 T write pulses 821 and 831 is of duration 2 T or longer, wrtpn2 signal 803 is asserted prior to the end of each of those pulses 821, 831, but for positive-going 1 T write pulse 811, wrtpn2 signal 803 is not asserted. Similarly, for negative-going 3 T write pulse 822 and negative-going 2 T write pulse 832, wrtpn2 signal 803 is asserted prior to the end of each of those pulses 822, 832, but for negative-going 1 T write pulse 812, wrtpn2 signal 803 is not asserted.

When wrtpn2 signal 803 is asserted, it is asserted for a duration of 1 T and, in the implementation of FIG. 8, at a time that precedes the end of the corresponding write pulse 821, 831, 822, 832 by an amount equal to 1 T minus an additional delay. Assertion of wrtpn2 signal 803 causes the corresponding write current to turn off, as described above, beginning at the time of assertion of wrtpn2 signal 803, until the normal end of the corresponding write interval, even though the end of the duration of assertion of wrtpn2 signal 803 is beyond the normal end (by the aforementioned additional delay amount) of the corresponding write interval. This corresponds to a latched (see FIG. 11) control signal 840 which, for positive-going pulses of data signal 801/802, rises on the rising edge of wrtpn2 signal 803 and falls on the falling edge of data signal 801, and a latched control signal 850 which, for negative-going pulses of data signal 801/802, rises on the rising edge of wrtpn2 signal 803 and falls on the falling edge of negative data signal 802.

The positive relaxation clock TMPRZ 860 is the difference between positive data signal 801 and latched control signal 840, and represents the time during which the OSD pulse and the write current IW are applied for a positive-going data pulse. The negative relaxation clock TMPRZ 870 is the difference between negative data signal 702 and latched control signal 850, and represents the time that the OSD pulse and the write current IW are applied for a negative-going data pulse.

Whether wrtpn2 signal 703/803 is early (703) or late (803), and by how much, may be adjustable. For example, in one implementation, the delay may be adjustable in increments of T/64 (e.g., by setting a six-bit variable in a control circuit, as discussed below).

Figure 9:
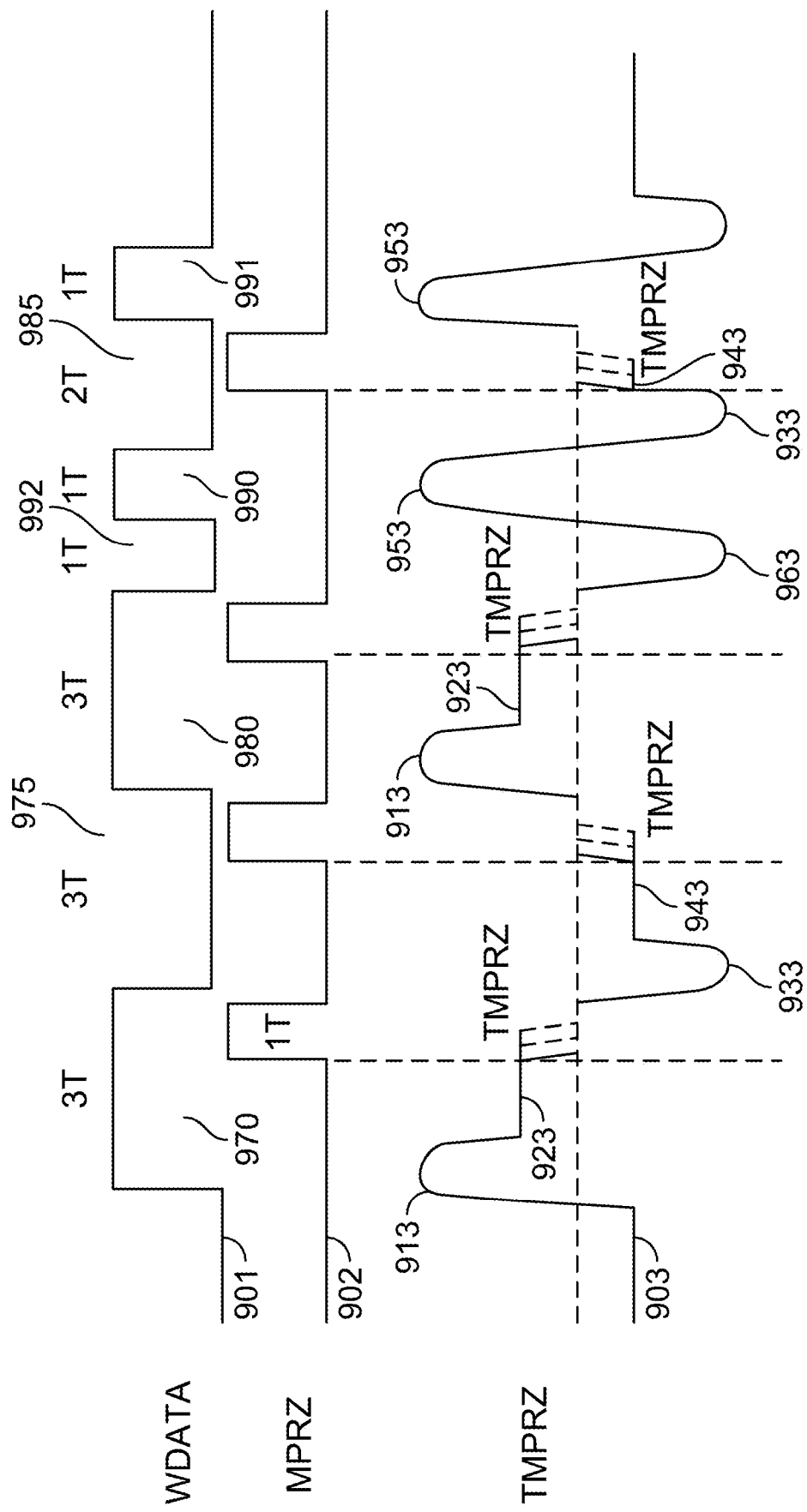
FIG. 9 is a signal diagram showing a simplification of FIGS. 7 and 8.

FIG. 9 is a simplified combined signal diagram showing the effect of wrtpn2 (MPRZ) signal 902 on write data (WDATA) signal 901, which is identical (positive leg shown only) to wrtpn data signal 701/702. The actual write current is shown at 903. This combined illustration is for the case where wrtpn2 (MPRZ) signal 902 is asserted sooner than 1 T before the end of the relevant data pulse, as in FIG. 7.

For the positive data pulses 970, 980 of duration 2 T or longer, write current 903 includes initial positive-going OSD pulse 913 (with OSA amplitude) followed by steady-state write current segments 923. Steady state write current segments 923 begin to decrease toward zero amplitude at the rising edge of each pulse of wrtpn2 (MPRZ) signal 902, reaching zero amplitude and remaining at zero amplitude until the falling edge of data signal 901. For the negative data pulses 975, 985 of duration 2 T or longer, write current 903 includes initial negative-going OSD pulse 933 (with OSA amplitude) followed by steady-state write current segments 943. Steady state write current segments 943 begin to increase toward zero amplitude at the rising edge of each pulse of wrtpn2 (MPRZ) signal 902, reaching zero amplitude and remaining at zero amplitude until the rising edge of data signal 901 (corresponding to the falling edge of the negative data signal 702). For data pulses of 1 T duration, whether positive (990, 991) or negative (992), there is only the respective positive (953) or negative (963) dOSA pulse of 1 T duration (not OSD duration). The variable timing of the return of steady-state write current segments 923, 943 to zero is indicated by multiple parallel dashed sloped lines.

Figure 10:
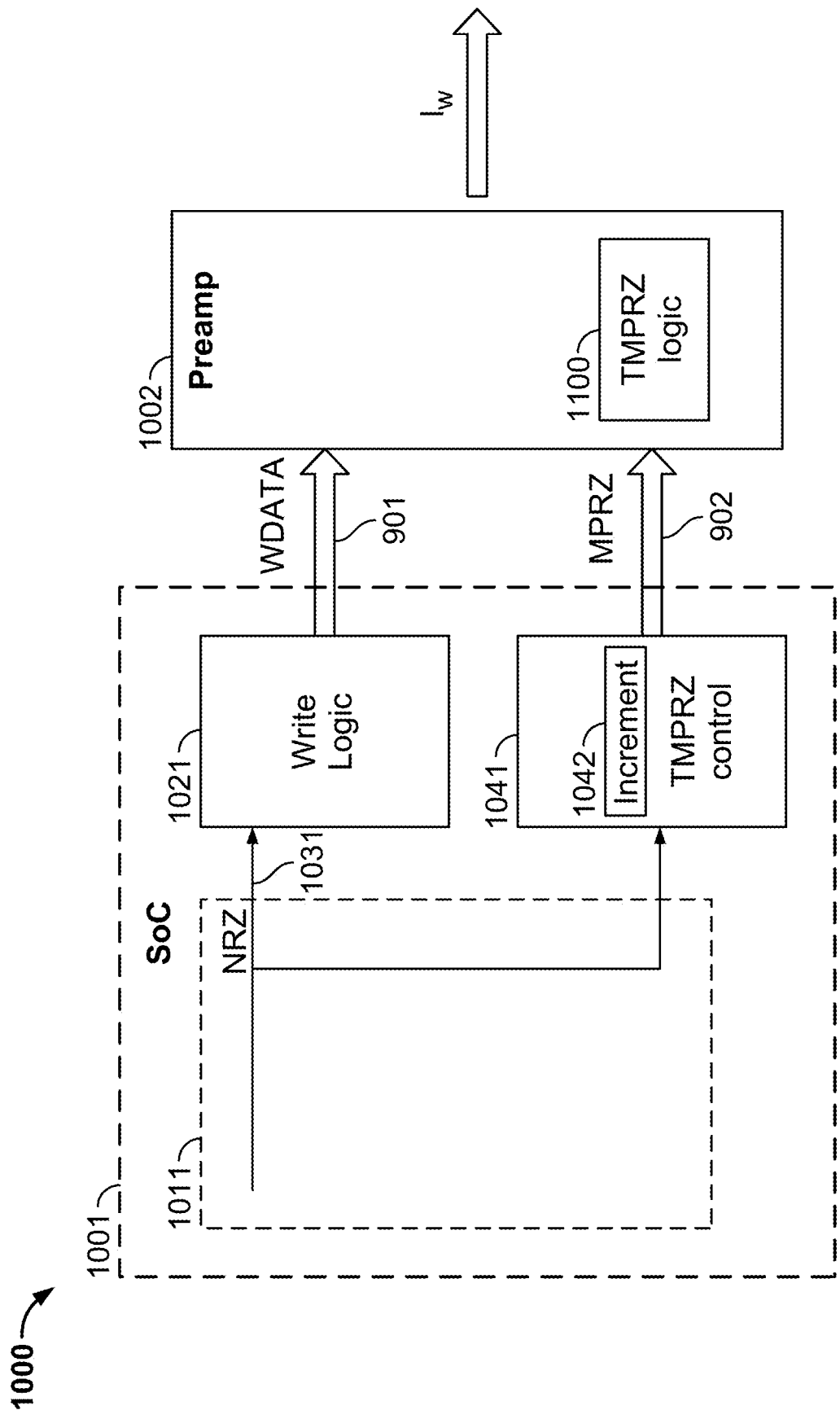
FIG. 10 is a diagram of a circuit architecture that may be used to generate the signals of FIGS. 7-9.

FIG. 10 shows an overall architecture for circuitry 1000 to derive the relaxation clock signal TMPRZ 770/870. Circuitry 1000 includes write channel control circuitry 1001 (which may be a system-on-chip) and preamplifier 1002. Write channel control circuitry 1001 includes data encoding circuitry 1011, write logic 1021 which derives data signal 901 from encoded signal 1031 (which may be, e.g., an NRZ signal), and TMPRZ control circuitry 1041 which derives MPRZ signal 902 from encoded signal 1031. TMPRZ control circuitry 1041 may include the aforementioned delay increment control 1042 for determining how early or late the pulses of MPRZ signal 902 occur relative to the end of the relevant data pulse.

Figure 11:
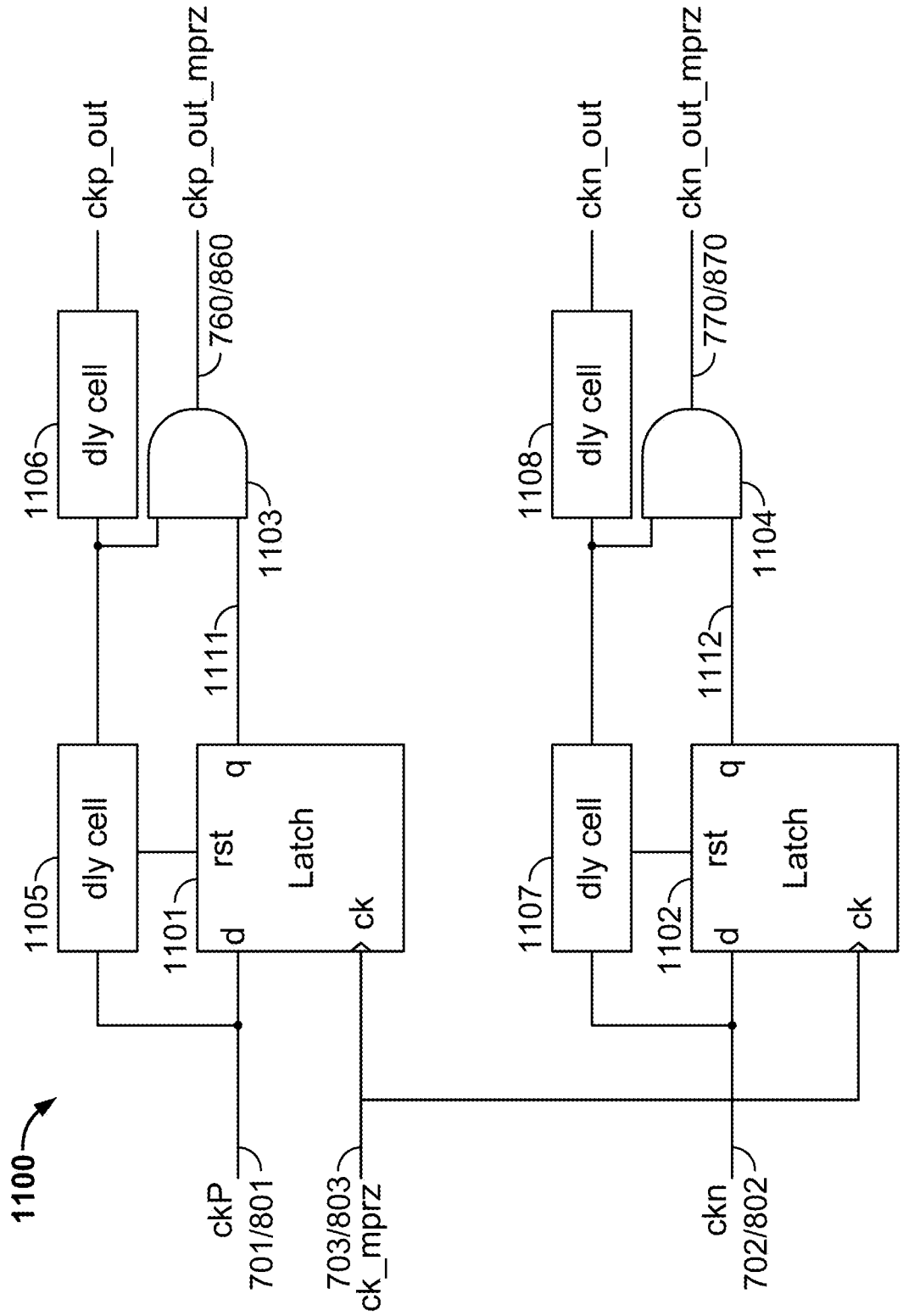
FIG. 11 shows circuitry which may be added to a preamplifier in accordance implementations with the subject matter of this disclosure.

FIG. 11 shows circuitry 1100 which may be added to preamplifier 1002 to control the shut-off of write current IW in accordance with implementations of the subject matter of this disclosure. Circuitry 1100 includes two latches (e.g., flip-flops) 1101, 1102, two AND-gates 1103, 1104 and four delays 1105, 1106, 1107, 1108. Latches 1101, 1102 are clocked by MPRZ clock (ck mprz) 703/803. Positive data signal 701/801 is input to latch 1101 while negative data signal 702/802 is input to latch 1102.

For latch 1101, output 1111 goes high on the next rising edge of ck mprz 703/803 following a rising edge of positive data signal 701/801. The inputs of AND-gate 1103 are positive data signal 701/801 and latch output 1111, and the output 1113 of AND-gate 1103 is positive TMPRZ data out 760/860. For positive TMPRZ data out 760/860 to be high, both inputs to AND-gate 1103 have to be high, which is why positive TMPRZ data out 760/860 falls when data signal 701/801 falls in the case where wrtpn2 is early, and why positive TMPRZ data out 760/860 falls when ck mprz 703/803 signal falls in the case where wrtpn2 is late. Delays

1105, 1106, 1107, 1108 maintain timing. Latch 1102 operates similarly to output negative TMPRZ data out 770/870.

Figure 12:
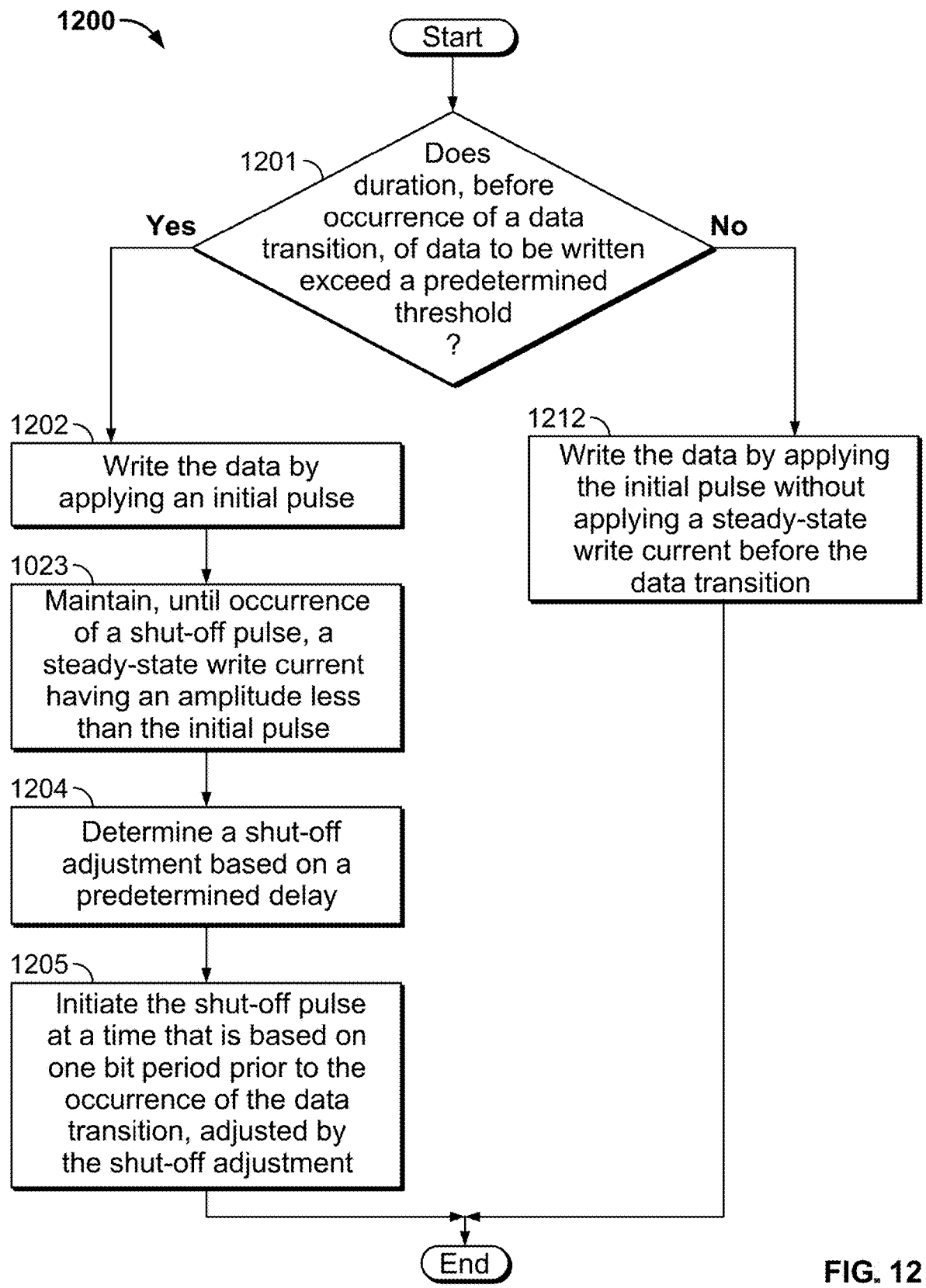
FIG. 12 is a flow diagram illustrating a method in accordance with implementations of the subject matter of this disclosure.

A method 1200 according to implementations of the subject matter of this disclosure for writing data to a magnetic data storage medium is diagrammed in FIG. 12. Method 1200 begins at 1201, where it is determined whether the duration, before occurrence of a next data transition, of data to be written exceeds a predetermined threshold. If so, then at 1202, the data is written by applying an initial pulse (which may have an overshoot amplitude and/or an overshoot duration as described above). Next, at 1203, a steady-state write current, having an amplitude less than the initial pulse, is maintained until occurrence of a shut-off pulse. At 1204, a shut-off adjustment is determined based on a predetermined delay. At 1205, the shut-off pulse is initiated at a time that is based on one bit period prior to the occurrence of the next data transition, adjusted by the shut-off adjustment. Method 1200 then ends.

If at 1201 it is determined that the duration, before occurrence of a next data transition, of data to be written does not exceed (i.e., is at most equal to) the predetermined threshold, then at 1212 the data is written by applying the initial pulse without applying a steady-state write current before the next data transition, and method 1200 then ends.

Thus it is seen that a writing mode in a disk drive, providing for main pole relaxation prior to a bit transition, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for writing data to a magnetic data storage medium, the method comprising:
    detecting whether duration, before occurrence of a data transition, of data to be written exceeds a predetermined threshold; and:
    when the duration, before the occurrence of the data transition, of the data to be written exceeds the predetermined threshold, writing the data by applying an initial pulse and then maintaining, until a shut-off pulse, a steady-state write current having an amplitude less than the initial pulse,
    determining a shut-off adjustment based on a predetermined delay,
    initiating the shut-off pulse at a time that is based on one bit period prior to the occurrence of the data transition, adjusted by the shut-off adjustment, and
    when the duration, before the occurrence of the data transition, of the data to be written is at most equal to the predetermined threshold, writing the data by applying the initial pulse without applying a steady-state write current before the data transition.

2. The method according to claim 1 for writing data to the magnetic data storage medium, wherein the predetermined threshold is a single bit duration.

3. The method according to claim 2 for writing data to the magnetic data storage medium wherein, when the duration, before the occurrence of the data transition, of the data to be written is a single-bit duration, the writing is performed by applying the initial pulse for all of the duration of the data to be written.

4. The method according to claim 2 for writing data to the magnetic data storage medium wherein, when the duration, before the occurrence of the data transition, of the data to be written exceeds a single-bit duration, the writing is performed by applying the initial pulse for a single-bit duration, plus an overshoot duration.

5. The method according to claim 1 for writing data to the magnetic data storage medium, further comprising, when the duration, before the occurrence of the data transition, of the data to be written exceeds the predetermined threshold:
    on occurrence of the shut-off pulse, reducing magnitude of the steady-state write current to zero; and
    maintaining zero steady-state write current until the data transition occurs.

6. The method according to claim 1 for writing data to the magnetic data storage medium, wherein:
    determining the shut-off adjustment based on the predetermined delay comprises determining the shut-off adjustment based on a programmable predetermined delay.

7. A storage device, comprising:
    a magnetic data storage medium;
    a write head for writing data onto the magnetic data storage medium; and
    control circuitry for controlling the writing of data onto the magnetic data storage medium, the control circuitry being configured to:
    detect whether duration, before occurrence of a data transition, of data to be written exceeds a predetermined threshold; and:
    when the duration, before the occurrence of the data transition, of the data to be written exceeds the predetermined threshold, write the data by applying an initial pulse and then maintain, until a shut-off pulse, a steady-state write current having an amplitude less than the initial pulse,
    determine a shut-off adjustment based on a predetermined delay,
    initiate the shut-off pulse at a time that is based on one bit period prior to the occurrence of the data transition, adjusted by the shut-off adjustment, and
    when the duration, before the occurrence of the data transition, of the data to be written is at most equal to the predetermined threshold, write the data by applying the initial pulse without applying a steady-state write current before the data transition.

8. The storage device of claim 7 wherein the predetermined threshold is a single bit duration.

9. The storage device of claim 8 wherein the control circuitry is configured to, when the duration, before the occurrence of the data transition, of the data to be written is a single-bit duration, write the data by applying the initial pulse for all of the duration of the data to be written.

10. The storage device of claim 8 wherein the control circuitry is configured to, when the duration, before the occurrence of the data transition, of the data to be written exceeds a single-bit duration, write the data by applying the initial pulse for a single-bit duration, plus an overshoot duration.

11. The storage device of claim 7 wherein the control circuitry is further configured to, when the duration, before the occurrence of the data transition, of the data to be written exceeds the predetermined threshold:
    on occurrence of the shut-off pulse, reduce magnitude of the steady-state write current to zero; and
    maintain zero steady-state write current until the data transition occurs.

12. The storage device of claim 7 wherein the control circuitry is configured to:
    determine the shut-off adjustment based on a programmable predetermined delay.

13. A storage device, comprising:
    a magnetic data storage medium;
    a write head for writing data onto the magnetic data storage medium;
    a preamplifier configured to apply write current signals to the write head; and
    control circuitry for controlling generation of the write current signals by the preamplifier for writing the data onto the magnetic data storage medium, the control circuitry comprising write logic configured to generate, from decoded source signals, data signals to be written onto the magnetic data storage medium by the write head, and magnetic pole control logic configured to:
    detect whether duration, before occurrence of a data transition, of data to be written exceeds a predetermined threshold; and:
    when the duration, before the occurrence of the data transition, of the data to be written exceeds the predetermined threshold, send instruction signals to the preamplifier to write the data by applying an initial pulse and then maintain, until a shut-off pulse, a steady-state write current having an amplitude less than the initial pulse,
    determine a shut-off adjustment based on a predetermined delay,
    initiate the shut-off pulse at a time that is based on one bit period prior to the occurrence of the data transition, adjusted by the shut-off adjustment, and
    when the duration, before the occurrence of the data transition, of the data to be written is at most equal to the predetermined threshold, send instruction signals to the preamplifier to write the data by applying the initial pulse without applying a steady-state write current before the data transition.

14. The storage device of claim 13 wherein the predetermined threshold is a single bit duration.

15. The storage device of claim 14 wherein the magnetic pole control logic is configured to, when the duration, before the occurrence of the data transition, of the data to be written is a single-bit duration, send instruction signals to the preamplifier to write the data by applying the initial pulse for all of the duration of the data to be written.

16. The storage device of claim 14 wherein the magnetic pole control logic is configured to, when the duration, before the occurrence of the data transition, of the data to be written exceeds a single-bit duration, send instruction signals to the preamplifier to write the data by applying the initial pulse for a single-bit duration, plus an overshoot duration.

17. The storage device of claim 13 wherein the magnetic pole control logic is further configured to, when the duration, before the occurrence of the data transition, of the data to be written exceeds the predetermined threshold:
    on occurrence of the shut-off pulse, send instruction signals to the preamplifier to reduce magnitude of the steady-state write current to zero, and maintain zero steady-state write current until the data transition occurs.

18. The storage device of claim 13 wherein the magnetic pole control logic is configured to:
    determine the shut-off adjustment based on a programmable predetermined delay.

19. The storage device of claim 13 wherein the preamplifier comprises latch circuitry for converting the instruction signals to control write current signals.

* * * * *